No. 40,206. PATENTED OCT. 6, 1863.
G. B. WRIGHT.
METHOD OF REGULATING THE SUPPLY OF WATER IN STEAM BOILERS.
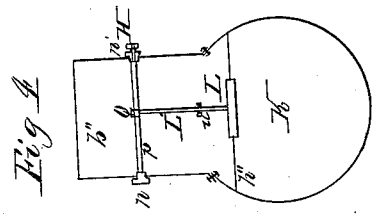
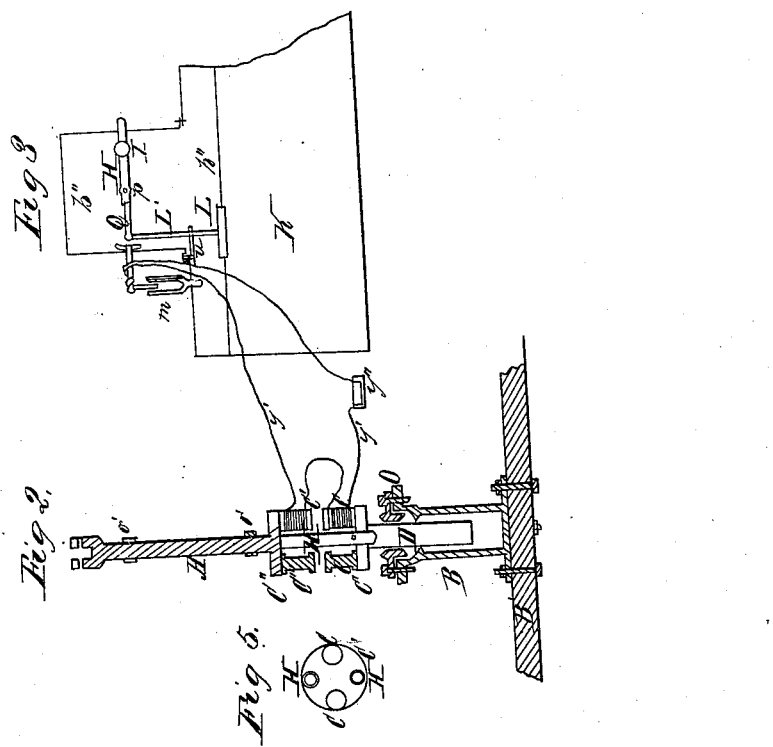
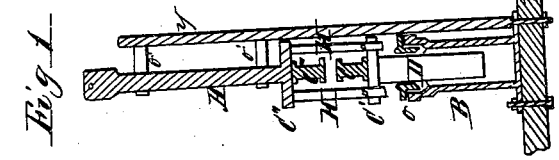

UNITED STATES PATENT OFFICE.

GEORGE B. WRIGHT, OF ELMIRA, NEW YORK.

IMPROVED METHOD OF REGULATING THE SUPPLY OF WATER IN STEAM-BOILERS.

Specification forming part of Letters Patent No. 40,206, dated October 6, 1863; antedated October 1, 1863.

*To all whom it may concern:*

Be it known that I, GEORGE B. WRIGHT, of Elmira, in the county of Chemung, in the State of New York, have invented a new and Improved Mode of Regulating the Supply of Water or other Substance to Steam-Boilers for the Generating of Power by the Interposition of Electricity and Electro-Magnets; and I do hereby declare that the following is a full, clear, and exact description of the application and operation of the same, reference being had to the annexed drawings, making a part of this specification, in which—

Figure 1 is a side elevation of a force-pump and its parts. Fig. 2 is a front elevation; Fig. 5, a plan of disk; Fig. 3, a longitudinal elevation of a boiler; Fig. 4, a transverse section of the same.

B′, Figs. 1 and 2, is the foundation of pump; B, body of pump; D, plunger working through stuffing-box $o$; A, a pump-rod working endwise or perpendicular through the guide-boxes $o'$ $o'$, which are held in place by the back post, $y$, which is secured at B′; C″, disk secured to the lower end of A and holding the helix C‴ C‴, and also the guide-rods $x$ $x$, which are permanently attached to it and work freely through the orifices of C′, which are shown at $x'$ $x'$, Fig. 5; C′, disk upon and secured permanently to D, and holds the helix C C, (the helices are insulated from the disk;) $y'$ $y'$, insulated wire with which the helices C C‴ are wound, (only one pair of which is shown to be wound in the drawings;) $y'''$, electro-galvanic battery, in which $y'$ $y'$ meet. (The modes of generating electricity are so numerous and so well understood that I need not describe them here, nor represent one in the drawings.)

K, Figs. 3 and 4, is the main part of steam-boiler; $b''$, the dome of the boiler; $p$, shaft passing through $b''$ near the center, working in a step-nut, $n$, and having a shoulder inside the stuffing-nut $n'$, through which it passes, (outward) to receive the two-ended lever H, which is made fast to it. A part of the lever H is removed at $g$, Fig. 3, in order to show the arm Q, which is fast at one end to the shaft $p$, and near its center it runs horizontally therefrom and parallel to the lever H, terminating in a jointed end near the side of the dome, to receive the rod L′, which passes downward through the guide $u$ to the float L, that lies in the surface of the water $h''$, and is counterpoised by the movable weight I upon the arm of H, that runs in the opposite direction to the arm Q. The other end of the lever H runs in the direction of and parallel to the arm Q, and is nearly twice the length of Q, and receives at its outer end the wires $y$ $y'$, which are attached to it in such a way that their disconnected ends project downward below the under side of the lever and terminate in the mouth of the cup $m$, which screws into the boiler in the proper place and position to receive them, and may be raised or lowered by the screw upon its lower end, by which it is held in place. The cup $m$ is partly filled with mercury and adjusted by the screw upon its shank, so as to bring the surface of the mercury in close proximity to the ends of the wires.

It will be understood by the foregoing specification that when the water falls in the boiler the float L (whose depth in the water is regulated by the weight I) will also fall, and by its connections dip the ends of the wires $y'$ $y'$ into the mercury-cup, thus completing the galvanic circuit which renders the helices C C C‴ C‴ magnetic. Now, as the pump-rod A descends to its lowest point of depression, being kept continuously in motion by power applied in any of the now known forms of driving pumps, and kept in its proper position by the guides $o'$ $o'$ and the guide-rods $x$ $x$, the faces of the helices C C C‴ C‴ come in contact with each other and are held together by the power of electro-magnetism, so that as the rod A recedes the plunger D is drawn up, which allows the pump to fill. Now, as the rod A is forced down the pump is discharged, and thus will continue to work until the water in the boiler, with the float L, raises the wires $y'$ $y'$ out of the mercury-cup $m$, which breaks the electric circuit and the helices become powerless. The pump then ceases to work, and remains inactive until further supply is wanted in the boiler, when the pump instantly resumes its work and performs its functions as before. Thus the supply to the boiler is more promptly and equitably given, and with less care on the part of the operator than can in any other known way be attained.

What I claim as my invention, and desire to secure by Letters Patent, is—

The combination of the electro-magnetic helix with steam-boiler force-pumps or their appurtenances, the helices being connected by conductors to the boiler or its appurtenances in such manner that the galvanic circuit is broken or completed by the rise and fall of floats or valves attached to the boiler or its appurtenances, thus regulating the supply in accordance with the demands of the boiler, as herein described, using for that purpose the aforesaid arrangement, or any other substantially the same, and which will produce the intended effect.

GEO. B. WRIGHT.

Witnesses:
GEO. L. DAVIS,
LEVI GIBBS.